United States Patent [19]

Thoman, Jr.

[11] Patent Number: 4,840,379
[45] Date of Patent: Jun. 20, 1989

[54] SPLIT SEALING RING HAVING A BIAS CUT

[75] Inventor: Richard A. Thoman, Jr., Kulpsville, Pa.

[73] Assignee: Greene, Tweed & Co., Kulpsville, Pa.

[21] Appl. No.: 213,024

[22] Filed: Jun. 29, 1988

[51] Int. Cl.⁴ .................................................. F16J 9/14
[52] U.S. Cl. ..................... 277/222; 277/144; 277/171
[58] Field of Search ............... 277/216, 217, 220–222, 277/144, 145, 170–172

[56] References Cited

U.S. PATENT DOCUMENTS

| 831,099 | 9/1906 | Restein . |
|---|---|---|
| 1,435,223 | 11/1922 | French . |
| 1,517,561 | 12/1924 | Lipsey . |
| 1,668,954 | 5/1928 | Faurot . |
| 1,965,294 | 7/1934 | Marshall . |
| 2,187,880 | 1/1940 | Kaysing . |
| 2,908,176 | 10/1959 | Brueggeman . |
| 3,180,649 | 4/1965 | Heygate ............................ 277/144 |
| 3,381,970 | 5/1968 | Brown ........................... 277/144 X |
| 3,414,277 | 12/1968 | Schmidt . |
| 4,165,203 | 8/1979 | Latzina et al. . |
| 4,189,161 | 2/1980 | Grimm . |
| 4,268,046 | 5/1981 | Nisper . |
| 4,438,937 | 3/1984 | Moriarty . |
| 4,449,721 | 5/1984 | Tsuge . |
| 4,468,041 | 8/1984 | Yoshimura et al. . |
| 4,475,739 | 10/1984 | Nakajima et al. . |
| 4,635,944 | 1/1987 | Sabo . |

FOREIGN PATENT DOCUMENTS 1212514 10/1959 France .
294539 3/1932 Italy .

Primary Examiner—Robert S. Ward
Attorney, Agent, or Firm—Panitch, Schwarze, Jacobs & Nadel

[57] ABSTRACT

An improved generally annular split sealing ring includes generally curved radially inner and outer surfaces and opposed first and second axial surfaces extending between the inner and outer surfaces. The sealing ring has an axially extending, radially centered axis and a cut extend therethrough from the inner radial surface to the outer radial surface to create a gap to facilitate installation and removal of the sealing ring. The cut extends through the sealing ring along a single continuous cut plane. The orientation of the cut plane is determined by establishing a first reference plane extending radially through the sealing ring and generally parallel to and through the axis. A second reference plane extends generally perpendicular to the first reference plane and midway between the first and second axial surfaces to establish a first generally radially extending reference line. A third reference plane extends generally perpendicular to the first and second reference planes and midway between the inner and outer radial surfaces to establish a second generally axially extending reference line and a third reference line. The cut plane is oriented at a first predetermined angle with respect to the second reference plane and the first reference line and at a second predetermined angle with respect to the third reference plane and the third reference line.

7 Claims, 2 Drawing Sheets

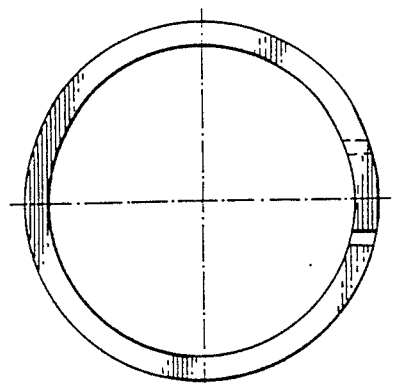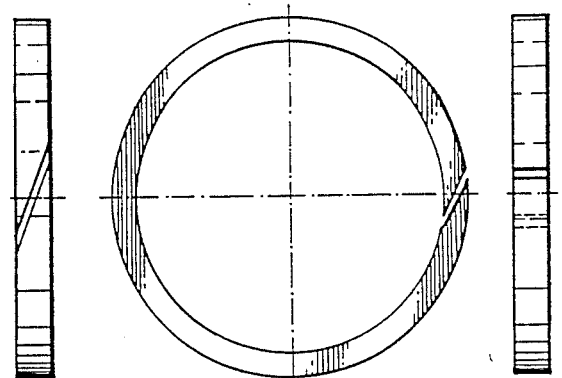
FIG. 1A PRIOR ART  FIG. 1B PRIOR ART  FIG. 2A PRIOR ART  FIG. 2B PRIOR ART
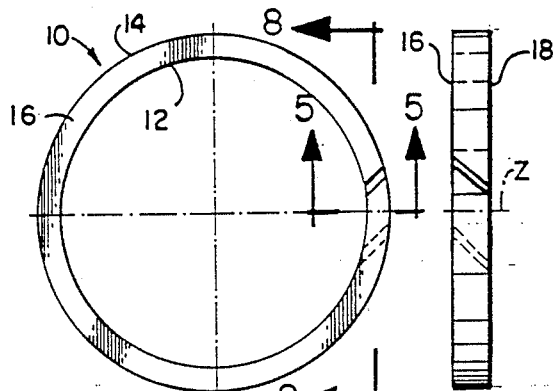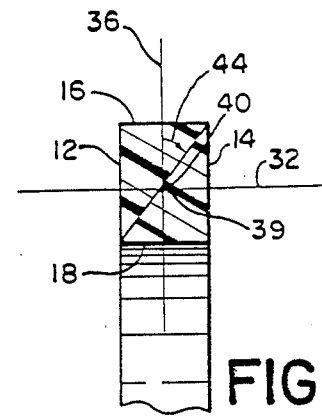
FIG. 3   FIG. 4   FIG. 5
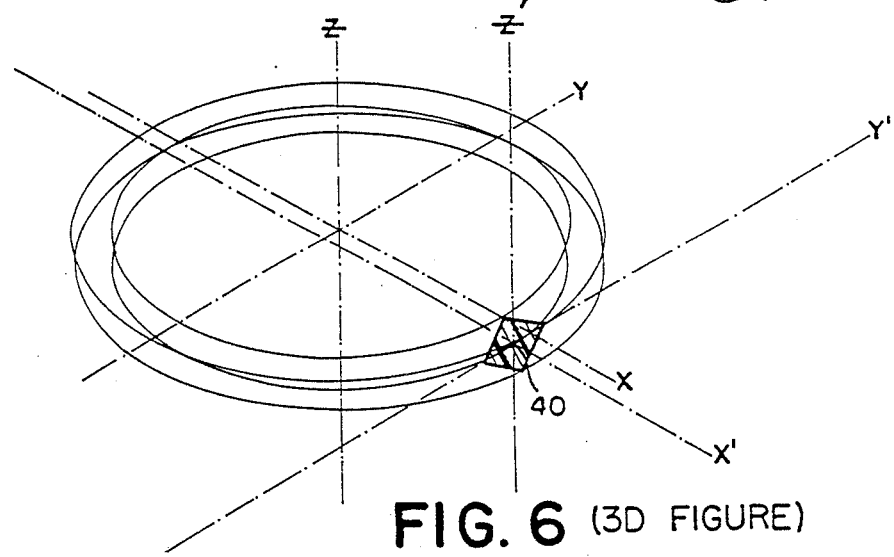
FIG. 6 (3D FIGURE)

SPLIT SEALING RING HAVING A BIAS CUT

BACKGROUND OF THE INVENTION

The present invention relates generally to sealing rings and, more particularly, to an improved split sealing ring to prevent extrusion damage to a packing or the like.

It is generally well known that most hydraulic or pneumatic systems employ elastomeric and/or plastic seals in order to prevent or control the flow or passage of fluid through the clearance between two closely fitting surfaces, generally cylindrical surfaces, such as a piston and cylinder, piston rod and rod guide or a rotating shaft and its surrounding housing. The closely fitting surfaces may be dynamic or movable with respect to each other, either in the axial or circumferential direction, or may be static or stationary with respect to each other.

In general, the seal is installed in a machined groove extending into one of the two surfaces to be sealed. Typically, the cross section of the seal is at least slightly larger than the cross section of the seal-receiving groove so that when the two surfaces to be sealed are brought together to form a gland, a portion of the cross section of the seal is squeezed, thereby absorbing the tolerance backup between the surfaces. When the seal is an elastomeric material, the elastomer is generally a highly viscous, incompressible fluid with a high surface tension, thereby giving the seal a "memory" or the tendency to return to its original shape. In low pressure applications, where the fluid being sealed exerts little or no pressure or force on the seal, as the seal is squeezed or deformed into the gland, the seal exerts a return force against the mating surface and the groove. In this manner, the seal firmly contacts both the mating surface and the groove to create a barrier for blocking the passage of fluid between the surfaces.

For applications in which higher pressures are exerted on the seal by the fluid, the sealing force of the squeezed seal is augmented by the system fluid pressure as it is transmitted through the elastomeric seal. FIG. 7 illustrates a typical high pressure seal assembly which employs an elastomeric seal element 60 which is shown as being T-shaped in cross-section. The seal element 60 is installed within a groove 62 cut within surface 64 for sealing the clearance 66 between curved surfaces 64 and 68. The pressure is typically transmitted through the portion of the seal element 60 engaging the groove (known as the "flange") which activates one or more generally rigid back-up rings or anti-extrusion rings 70. The back-up rings 70 are forced out of the groove and into the clearance 66 between the two curved surfaces 64 and 68. In sealing systems of this type, the primary function of the back-up rings 70 is to prevent the softer elastomeric seal element 60 or packing from being damaged as a result of its being forced or extruded into the clearance 66.

PTFE is a typical material used for the manufacture of such back-up rings since the PTFE provides adequate extrusion resistance for fluid pressure up to approximately 3000 p.s.i. Alternatively, such back-up rings could be made of another high strength generally rigid material such as Nylon, Peek, filled PTFE or even metal, depending upon the fluid pressures involved. In order to facilitate the installation of a rigid back-up ring of this type into a typical seal gland on or around a piston or in a rod housing, the back-up ring is split or cut completely therethrough at one place on its circumference. Of course, once the ring is cut, it no longer provides a perfect, endless circumferential plane of protection for the seal or packing element of the seal assembly. As a result, the back-up ring tends to separate at the split, particularly in high pressure applications, permitting the softer seal element or packing element to extrude into the resulting gap in the back-up ring, causing deterioration of the seal element.

Numerous methods have previously been attempted and employed in order to prevent or minimize the gap in the back-up ring and to thereby prevent such extrusion of the seal element. One such method involves placing the cut in the back-up ring at an angle with respect to the axial surfaces of the ring with the cut extending from one axial surface to the other axial surface. This type of cut, known as a "scarf" cut is illustrated in FIGS. 1A and 1B. While the scarf cut is effective in minimizing the gap in the back-up ring with respect to forces or extrusion in the axial direction (i.e., into or out of the paper when viewing FIG. 1A), this cut provides virtually no protection for forces or extrusion extending in the radial direction (i.e., into or out of the paper when viewing FIG. 1B).

A second method of maintaining the gap in the back-up ring to a minimum involves making the cut along an angle with respect to a tangent on a circumferential surface of the ring with the cut extending from the outer to the inner circumferential surfaces of the back-up ring. This type of prior art cut, known as a "skive" cut is illustrated in FIGS. 2A and 2B. The skive cut is effective in maintaining minimum gap size and minimum extrusion with respect to forces or extrusion extending in the radial direction (i.e., into or out of the paper when viewing FIG. 2B), but affords little or no protection with respect to forces or extrusion extending in the axial direction (i.e., into or out of the paper when viewing FIG. 2A).

While seal assemblies having a back-up ring with a scarf cut are effective in some applications and seal assemblies with a back-up ring having a skive cut are effective in other applications, there are applications in which the back-up ring experiences both axial and radial forces. In such applications, neither of these back-up rings is particularly effective. In addition, it is desirable to have a seal assembly of a single design which is effective for a variety of different sealing applications in which the back-up ring can experience axial or radial forces, or both, and still properly function. The present invention overcomes the disadvantages of seal assemblies having a back-up ring with either a scarf or a skive cut by providing a cut, referred to as a "bias" cut which, when properly configured, provides efficient extrusion protection with respect to forces in both the axial and radial directions. The present invention relates to a split sealing ring in which the cut is a combination of both the scarf and skive cuts to provide both an axial and a radial bearing plane at the split, thereby affording the advantages of both of these prior cuts in a single sealing ring.

SUMMARY OF THE INVENTION

Briefly stated, the present invention comprises an improved, generally annular split sealing ring having generally curved radially inner and radially outer surfaces and opposed first and second axial surfaces extending between the inner and outer surfaces. The sealing ring has an axially extending radially centered axis with a cut extending through the sealing ring from the inner radial surface to the outer radial surface to create a gap for facilitating installation and removal of the sealing ring. The cut extends through the sealing ring along a single continuous cut plane, the orientation of the cut plane being determined by establishing a first reference plane extending generally radially through the sealing ring and generally parallel to and through the axis. A second reference plane extends generally perpendicular to the first reference plane and midway between the first and second axial surfaces to establish a first, generally radially extending reference line. A third reference plane extends generally perpendicular to the first and second reference planes and midway between the inner and outer radial surfaces to establish a second generally axially extending reference line and a third reference line. The cut plane is oriented at a first predetermined angle with respect to the second reference plane and the first reference line and at a second predetermined angle with respect to the third reference plane and the third reference line.

BRIEF DESCRIPTION OF THE DRAWINGS

The foregoing summary, as well as the following detailed description, will be better understood when read in conjunction with the appended drawings. For the purpose of illustrating the present invention, there is shown in the drawings an embodiment which is presently preferred, it being understood, however, that this invention is not limited to the precise arrangements and instrumentalities shown. In the drawings:

FIG. 1A is a top plan view of a split sealing ring with a scarf cut;

FIG. 1B is an elevational view of the sealing ring of FIG. 1A;

FIG. 2A is a top plan view of a split sealing ring with a skive cut;

FIG. 2B is an elevational view of the sealing ring of FIG. 2A;

FIG. 3 is a top plan view of a sealing ring having a bias cut in accordance with the present invention;

FIG. 4 is an elevational view of the seal of FIG. 3;

FIG. 5 is a partial sectional view of the sealing ring taken along line 5—5 of FIG. 3;

FIG. 6 is a three-dimensional perspective view of the sealing ring of FIG. 3 showing, in section, one of the surfaces created by the bias cut;

DESCRIPTION OF PREFERRED EMBODIMENT

Figure 7:
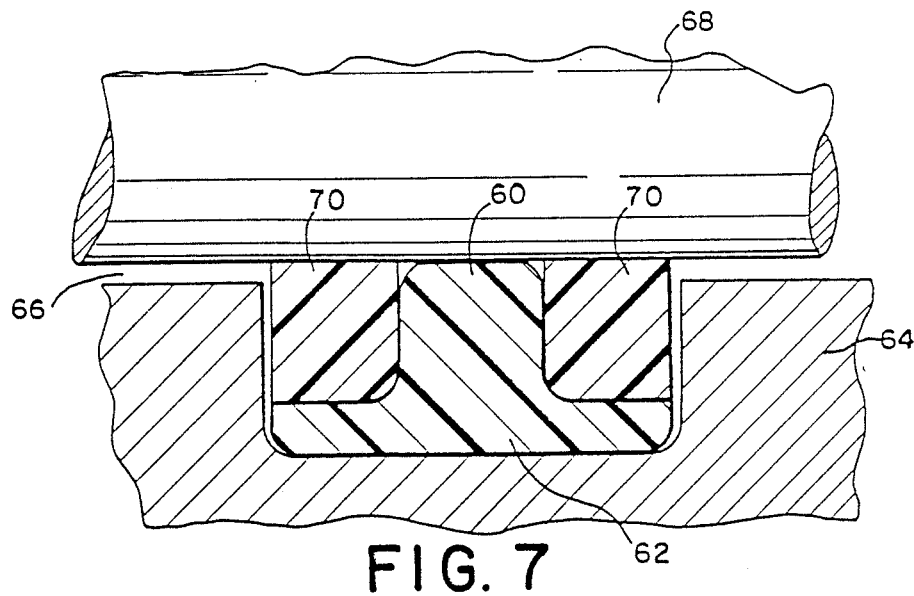
FIG. 7 is a sectional view illustrating a seal assembly employed for sealing the clearance between two curved surfaces.

Referring now to FIGS. 3 through 6, there are shown several different views of a preferred embodiment of a back-up ring 10 in accordance with the present invention. The back-up ring 10 is generally annular and includes a generally curved radially inner surface 12 and a generally curved radially outer surface 14. The back-up ring 10 also includes first and second generally axial surfaces 16 and 18, respectively, extending between the radially inner and outer surfaces 12 and 14. In the embodiment shown, the axial surfaces 16 and 18 are generally parallel to each other, the distance between the inner surface 12 and the outer surface 14 generally corresponds to the distance between the axial surfaces 16 and 18, and the edges where the four surfaces intersect are generally at ninety degree angles so that the radial cross section of the ring 10 is generally square. The back-up ring 10 also has an axially extending, radially centered axis identified in FIG. 6 as "Z." In the presently preferred embodiment, the back-up ring 10 is formed of a relatively rigid material such as PTFE, nylon, Peek, or any other such high strength material known in the sealing art. The specific material used to form the back-up ring varies, depending upon the particular sealing application.

As previously indicated, the back-up ring 10 is split or cut completely through along a single continuous cut plane extending between the axial surfaces 16 and 18 from the inner radial surface 12 to the outer radial surface 14 for creating a gap to facilitate installation and removal of the back-up ring 10 from a sealing gland. As discussed above, the cut employed with the back-up ring 10 is a bias cut, which is a combination of the scarf cut shown in FIGS. 1A and 1B and the skive cut shown in FIGS. 2A and 2B. In this manner, the advantages of both of the prior art cuts are afforded in a single back-up ring 10.

The single cut extending through the back-up ring 10 is angled in two directions, in a manner which will hereinafter become apparent. In the presently preferred embodiment, the scarf angle component of the cut is set at 15 degrees. The skive angle component of the cut is determined from the cross sectional configuration, i.e., the relationship between the thickness of the ring in the axial direction and the thickness of the ring in the radial direction. In the presently preferred embodiment, in which the cross section of the back-up ring 10 is square, the angle of the skive component of the cut is set at 45 degrees.

In making the cut in the back-up ring, the 15 degree scarf component is determined by first establishing a plane for a generally circular cutting blade with its center extending through the axis of the back-up ring, but oriented at an angle of 15 degrees with respect to the axial center of the back-up ring and a selected radius. The cutting blade plane is then positioned along the selected radius with its center midway between the radial inner surface 12 and the radial outer surface 14. The cutting blade plane is then rotated 45 degrees with respect to an axially extending line extending through the point at which the center of the plane passes through the point midway between the radially inner surface 12 and the radially outer surface 14 of the back-up ring 10 to establish the skive component. The cut is then made. In this manner, the bias cut extends through a central point on the back-up ring, which is along a radius of the back-up ring midway between the inner surface 12 and the outer surface 14 and midway between the first axial surface 16 and the second axial surface 18.

Figure 9:
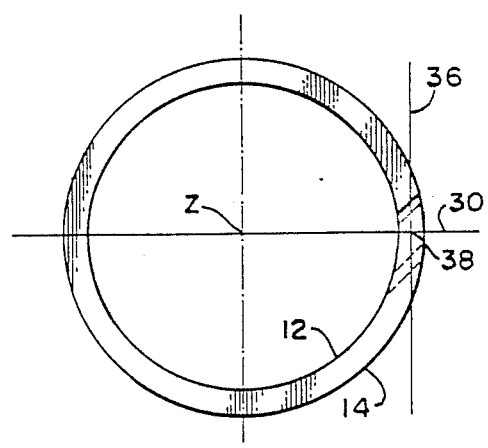
FIG. 9 is a top plan view of the sealing ring of FIG. 3 showing a first and a third reference plane.
Figure 10:
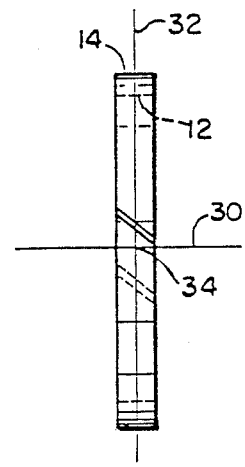
FIG. 10 is an elevational view of the sealing ring of FIG. 3 showing a first and a second reference plane.

Referring now to FIGS. 9 and 10, there is shown a top plan view and side elevational view of the back-up ring 10 with three reference planes added to more clearly define and demonstrate the angled components of the cut. The actual cut plane is determined by establishing a first reference plane 30 extending radially through the sealing ring 10 and generally parallel to and through the axis Z. In FIG. 9, the first reference plane 30, as well as the axis Z are indicated as extending into and out of the paper. A second reference plane 32, best shown in FIG. 10, extends generally perpendicular to the first reference plane 30 and perpendicular to the axis Z and is generally midway between the first and second axial surfaces 16 and 18. In FIG. 10, both the first and second reference planes 30 and 32 extend generally into and out of the paper. The intersection of the first and second reference planes 30 and 32 establish a first generally radially extending reference line 34 midway between the axial surfaces 16 and 18, which also extends into and out of the paper in FIG. 10.

Figure 8:
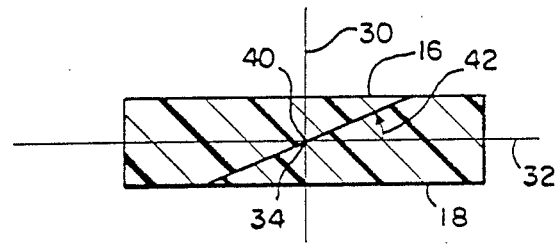
FIG. 8 is a partial sectional view of the sealing ring taken along line 8—8 of FIG. 3.

A third reference plane shown in FIG. 9 as 36 extends generally perpendicular to the first reference plane 30, generally midway between the inner and outer radial surfaces 12 and 14 to establish a second, generally axially extending reference line 38. In FIG. 9, the third reference plane 36 and the second reference line 38 extend into and out of the paper. The third reference plane 36 is also generally perpendicular to the second reference plane 32 to establish a third reference line 39 which in FIG. 5 extends into and out of the paper. In this manner, the intersection of the first reference line 34, the second reference line 38 and the third reference line 39 establishes a center point 40 which is both midway between the inner and outer radial surfaces 12 and 14 and midway between the first and second axial surfaces 16 and 18. The bias cut plane passes through the center point 40. The center point 40 which is also shown in FIGS. 5 and 6 is also employed, in conjunction with reference planes 32 and 36, to establish the scarf and skive components of the cut, as previously described. The cut plane is oriented at a first predetermined angle 42 (FIG. 8) with respect to the second reference plane 32 and the first reference line 34 at the center point 40 and at a second predetermined angle 44 (FIG. 5) with respect to the third reference plane 36 and the third reference line 39 at the center point 40.

In the presently preferred embodiment, the first predetermined angle 42 is 15 degrees. Similarly, in the presently preferred embodiment, the second predetermined angle 44 is 45 degrees. However, when the cross sectional area of the back-up ring 10 is not square, the second predetermined angle may be some other angle, such as an angle having a tangent which is determined by the distance between the first and second axial surfaces 16 and 18 divided by the distance between the inner and outer radial surfaces 12 and 14.

It will be appreciated by those skilled in the art that the first and/or the second predetermined angle may vary, depending upon the particular type of back-up ring being employed and/or depending upon the particular application for the back-up ring. Thus, it should be clearly recognized by those skilled in the art that the angles, 15 degrees and 45 degrees, employed in conjunction with the presently preferred embodiment are primarily for the purpose of illustrating the invention and that any other suitable angles may alternatively be employed. For example, the applicant has determined that with a back-up ring having a generally rectangular cross section in which the distance between the axial surfaces is substantially greater than the distance between the inner and outer radial surfaces, a second predetermined angle of about 60 degrees is preferred. The applicant has also determined that it is generally desirable to vary the size of the first predetermined angle as the overall diameter of the back-up ring changes. For example, a back-up ring having a smaller diameter should have a larger first predetermined angle (for example 22 degrees) than a back-up ring having a larger diameter. The applicant's present experimentation indicates that the presently preferred range for the second predetermined angle extends between a minimum of about 30 degrees and a maximum of about 60 degrees. However, it should be recognized by those skilled in the art that the currently preferred range of the second predetermined angle should not be considered to be a limitation on the present invention.

It will be appreciated by those skilled in the art that the present invention is not limited to a back-up ring of the type described above, which is generally square in cross section. Thus, the bias cut may be employed with back-up rings having a different cross sectional profile, such as a radiused profile as depicted in FIG. 7, rectangular profile, trapezoidal and/or wedge configuration. In making the bias cut in a back-up ring having a configuration which is not square, the same basic principles with respect to establishing the three reference planes, as described above, are equally applicable to such non-square cross-sectional rings.

From the foregoing description, it can be seen that the present invention comprises an improve split annular sealing ring having a bias cut. It will be recognized by those skilled in the art that changes may be made to the above-described embodiment of the invention without departing from the broad inventive concepts thereof. It is understood, therefore, that this invention is not limited to the particular embodiment disclosed, but it is intended to cover all modifications which are within the scope and spirit of the invention as defined by the appended claims.

I claim:

1. An improved, generally annular split sealing ring having generally curved radially inner and radially outer surfaces and opposed first and second axial surfaces extending between the radially inner and outer surfaces, the sealing ring having an axially extending, radially centered axis and a cut extending therethrough from the inner radial surface to the outer radial surface to create a gap for facilitating installation and removal of the sealing ring, wherein the improvement comprises:

the cut extending through the sealing ring along a single continuous cut plane, the orientation of the cut plane being determined by establishing a first reference plane extending radially through the sealing ring and generally parallel to and through the axis, a second reference plane extending generally perpendicular to the first reference plane and generally midway between the first and second axial surfaces to establish a first generally radially extending reference line, and a third reference plane extending generally perpendicular to the first and the second reference planes and midway between the inner and outer radial surfaces to establish a second generally axially extending reference line and a third reference line, the cut plane being oriented at a first predetermined angle with respect to the second reference plane and the first reference line, and at a second predetermined angle with respect to the third reference plane and the third reference line.

2. The improved sealing ring as recited in claim 1 wherein the first predetermined angle is fifteen degrees.

3. The improved sealing ring as recited in claims 1 wherein the first predetermined angle is twenty-two degrees.

4. The sealing ring as recited in claim 1 wherein the second predetermined angle has a tangent which is determined by the distance between the first and second axial surfaces divided by the distance between the inner and outer radial surfaces.

5. The sealing ring as recited in claim 1 wherein the second predetermined angle is between thirty degrees and sixty degrees.

6. The sealing ring as recited in claim 1 wherein the distance between the radial inner and outer surfaces is generally equal to the distance between the first and second axial surfaces, and wherein the second predetermined angle is forty-five degrees.

7. An improved, generally rigid annular split back-up ring for a seal assembly, the back-up ring having generally curved radially inner and radially outer surfaces and opposed first and second axial surfaces extending between the radially inner and outer surfaces, the back-up ring having an axially extending, radially centered axis and a cut extending therethrough from the inner radial surface to the outer radial surface to create a gap for facilitating installation and removal of the back-up ring, wherein the improvement comprises:

the cut extending through the back-up ring along a single continuous cut plane, the orientation of the cut plane being determined by establishing a first reference plane extending radially through the back-up ring and generally parallel to and through the axis, a second reference plane extending generally perpendicular to the first reference plane and generally midway between the first and second axially surfaces to establish a first generally radially extending reference line, and a third reference plane extending generally perpendicular to the first and second reference planes and midway between the inner and outer radial surfaces to establish a second generally axially extending reference line and a third reference line, the cut plane being oriented at a first predetermined angle with respect to the second reference plane and the first reference line, and at a second predetermined angle with respect to the third reference plane and the third reference line, the cut creating opposed surfaces which engage to form a seal when the gap is closed to provide extrusion protection in both the axial and radial directions.

* * * * *